United States Patent
Tsai et al.

(10) Patent No.: US 12,437,514 B2
(45) Date of Patent: *Oct. 7, 2025

(54) VIDEO DOMAIN ADAPTATION VIA CONTRASTIVE LEARNING FOR DECISION MAKING

(71) Applicant: NEC Laboratories America, Inc., Princeton, NJ (US)

(72) Inventors: Yi-Hsuan Tsai, Santa Clara, CA (US); Xiang Yu, Mountain View, CA (US); Bingbing Zhuang, San Jose, CA (US); Manmohan Chandraker, Santa Clara, CA (US); Donghyun Kim, Mukilteo, WA (US)

(73) Assignee: NEC Corporation, Tokyo (JP)

(*) Notice: Subject to any disclaimer, the term of this patent is extended or adjusted under 35 U.S.C. 154(b) by 907 days.

This patent is subject to a terminal disclaimer.

(21) Appl. No.: 17/521,057

(22) Filed: Nov. 8, 2021

(65) Prior Publication Data

US 2022/0147761 A1 May 12, 2022

Related U.S. Application Data

(60) Provisional application No. 63/114,120, filed on Nov. 16, 2020, provisional application No. 63/113,464, (Continued)

(51) Int. Cl.
| | |
|---|---|
| G06V 10/74 | (2022.01) |
| G06F 18/214 | (2023.01) |
| G06F 18/22 | (2023.01) |
| G06N 3/08 | (2023.01) |
| G06V 10/75 | (2022.01) |
| G06V 10/774 | (2022.01) |

(52) U.S. Cl.
CPC ........ *G06V 10/774* (2022.01); *G06F 18/2155* (2023.01); *G06F 18/22* (2023.01); *G06N 3/08* (2013.01); *G06V 10/74* (2022.01); *G06V 10/751* (2022.01)

(58) Field of Classification Search
CPC .... G06V 10/774; G06V 10/751; G06V 10/74; G06F 18/2155; G06F 18/22; G06N 3/08; G06N 3/045; G06N 3/084
See application file for complete search history.

(56) References Cited

U.S. PATENT DOCUMENTS

2021/0319266 A1* 10/2021 Chen .................... G06V 10/764

OTHER PUBLICATIONS

Jing, Ya, et al. "Cross-modal cross-domain moment alignment network for person search." Proceedings of the IEEE/CVF Conference on Computer Vision and Pattern Recognition. 2020. (Year: 2020).*

(Continued)

*Primary Examiner* — Jennifer N Welch
*Assistant Examiner* — Megan Elizabeth Hwang
(74) *Attorney, Agent, or Firm* — Joseph Kolodka

(57) ABSTRACT

Video methods and systems include extracting features of a first modality and a second modality from a labeled first training dataset in a first domain and an unlabeled second training dataset in a second domain. A video analysis model is trained using contrastive learning on the extracted features, including optimization of a loss function that includes a cross-domain regularization part and a cross-modality regularization part.

13 Claims, 7 Drawing Sheets

Related U.S. Application Data filed on Nov. 13, 2020, provisional application No. 63/111,766, filed on Nov. 10, 2020.

(56) References Cited

OTHER PUBLICATIONS

Xu, Dejing, et al. "Video question answering via gradually refined attention over appearance and motion." Proceedings of the 25th ACM international conference on Multimedia. 2017. (Year: 2017).*

Pereira, Jose Costa, and Nuno Vasconcelos. "Cross-modal domain adaptation for text-based regularization of image semantics in image retrieval systems." Computer Vision and Image Understanding 124 (2014): 123-135. (Year: 2014).*

Ma, Xinhong, Tianzhu Zhang, and Changsheng Xu. "Deep multi-modality adversarial networks for unsupervised domain adaptation." IEEE Transactions on Multimedia 21.9 (2019): 2419-2431. (Year: 2019).*

Munro, Jonathan, et al. "Multi-modal domain adaptation for fine-grained action recognition", arXiv:2001.09691v2 [cs.CV]. Mar. 19, 2020, pp. 1-11.

Kim, Donghyun, et al. "Learning Cross-Modal Contrastive Features for Video Domain Adaptation", arXiv:2108.11974v1 [cs.CV]. Aug. 26, 2021, pp. 1-12.

Choi, Jinwoo, et al. "Shuffle and attend: Video domain adaptation", InEuropean Conference on Computer Vision, Springer, Cham. Aug. 23, 2020, pp. 1-17.

Choi, Jinwoo, et al. "Unsupervised and semi-supervised domain adaptation for action recognition from drones", InProceedings of the IEEE/CVF Winter Conference on Applications of Computer Vision. Mar. 2020, pp. 1717-1726.

* cited by examiner

VIDEO DOMAIN ADAPTATION VIA CONTRASTIVE LEARNING FOR DECISION MAKING

RELATED APPLICATION INFORMATION

This application claims priority to U.S. Provisional Patent Application No. 63/111,766, filed on Nov. 10, 2020, to U.S. Provisional Patent Application No. 63/113,464, filed on Nov. 13, 2020, and to U.S. Provisional Patent Application No. 63/114,120, filed on Nov. 16, 2020, each incorporated herein by reference in its entirety.

BACKGROUND

Technical Field

The present invention relates to video data analysis, and, more particularly, to knowledge transfer between video domains.

Description of the Related Art

Videos may be labeled using machine learning systems that are trained with labeled training data. The training data may be labeled according to a first domain. However, applying such trained models to another, unlabeled domain, may reduce performance due to the difference in domains.

SUMMARY

A video method includes extracting features of a first modality and a second modality from a labeled first training dataset in a first domain and an unlabeled second training dataset in a second domain. A video analysis model is trained using contrastive learning on the extracted features, including optimization of a loss function that includes a cross-domain regularization part and a cross-modality regularization part.

A video method includes extracting features of a first modality and a second modality from a labeled first training dataset in a first domain, relating to video taken from a first perspective, and an unlabeled second training dataset in a second domain, relating to video taken from a second, different perspective. A video analysis model is trained using contrastive learning on the extracted features. Training the video analysis model includes generating pseudo-labels for the unlabeled training dataset using the video analysis model and optimization of a loss function that includes a cross-domain regularization part and a cross-modality regularization part, that compares features from different cue types in a same domain.

A video system includes a hardware processor and a memory that stores a computer program. When executed by the hardware processor, the computer program causes the hardware processor to extract features of a first modality and a second modality from a labeled first training dataset in a first domain and an unlabeled second training dataset in a second domain, and to train a video analysis model using contrastive learning on the extracted features, including optimization of a loss function that includes a cross-domain regularization part and a cross-modality regularization part.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Information from labeled source training data in a first domain can be transferred to training data in an unlabeled second domain. Downstream video analysis can then be performed on both domains, without the need for labor-intensive annotation in the second domain. In this manner, existing corpuses of training domain in the first domain (e.g., third-person videos) can be used to train video analysis systems in domains such as first-person videos, unmanned aerial videos, and unmanned ground vehicles, where training data may not be as easy to acquire and annotate. This knowledge transfer may be performed using unsupervised contrastive learning.

Video analysis processes complex background information when capturing video frames in a continuous, dynamic fashion. For example, camera movement, body motion, and diverse backgrounds may complicate video analysis. As a result learning effective feature representations for video analysis can be challenging. When changing from one domain to the other, the behavior and appearance of the background may change significantly, which can cause a trained machine learning system to have difficulty processing the new domain. However, multiple cues can be extracted from the videos to enhance the feature representations for knowledge transfer in domain adaptation.

Figure 1:
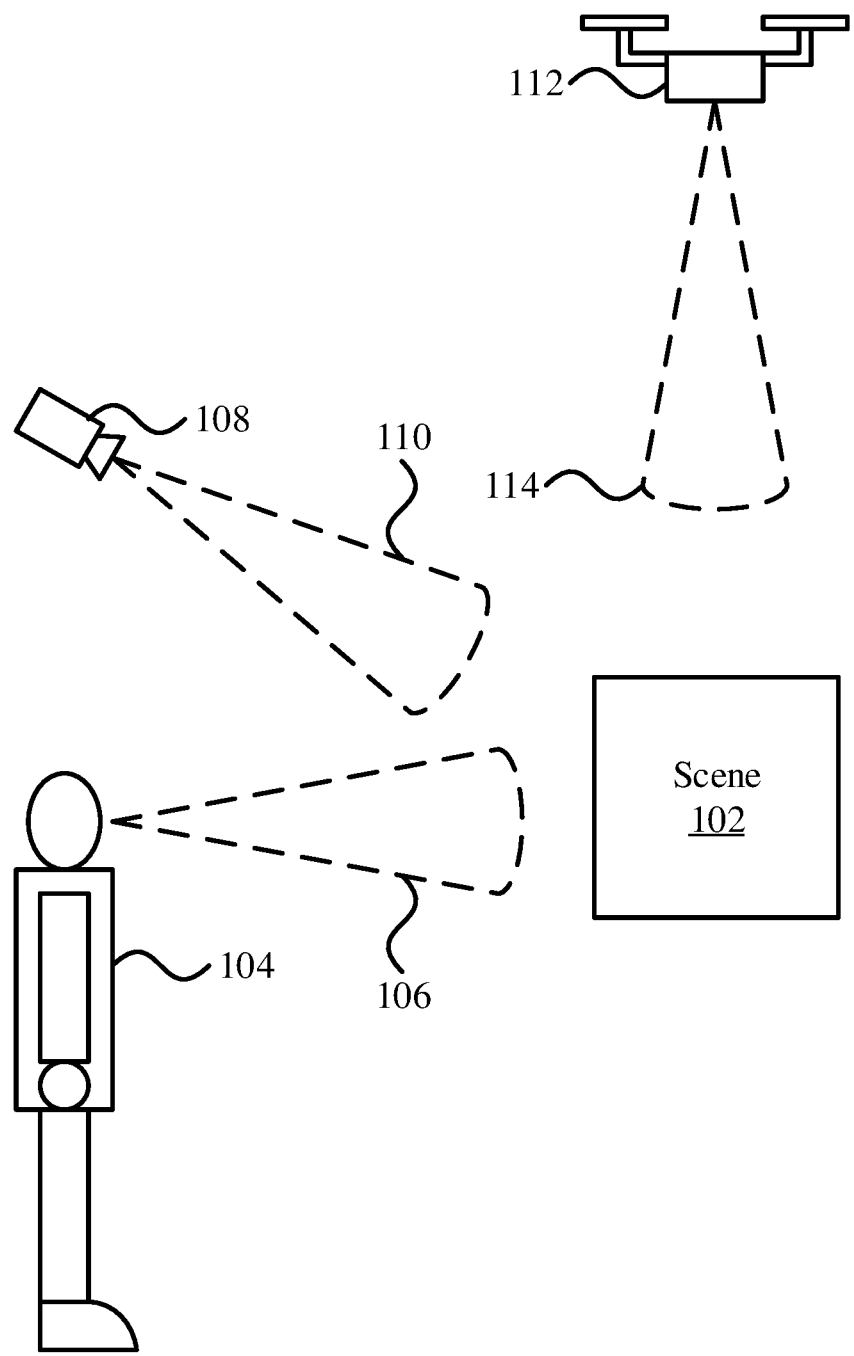
FIG. 1 is a diagram comparing video of a scene that is taken in different domains, in accordance with an embodiment of the present invention.

Referring now to FIG. 1, a comparison of different visual domains is shown. A single scene 102 is viewed from three different vantage point. In a first-person view 106, a person 104 collects video information from their own vantage point. This may be performed using, for example, a wearable video camera or a handheld electronic device. The first-person view 106 may be affected by motion of the person 104, whether due to deliberate travel around the scene 102 or by unconscious motion of the person's body.

In a third-person view 110, a fixed video camera 108 (e.g., a security camera) may capture video data from an elevated position. This may give the third-person view 110 a perspective view of the scene 102, providing a view from above and to the side. Additionally, because the video camera 108 may be fixed in place, the third-person view 110 may not include motion relative to the scene 102.

In a top-down view 114, an aerial camera may be attached to a manned or unmanned aerial vehicle 112, providing a view of the scene 102 from above. The aerial vehicle 112 may be significantly distant from the scene 102, and may be in motion relative to the scene 102.

In each of these cases, the manner in which video data is captured, and the positioning and orientation of the video camera, results in substantially different information about the scene 102 being captured. Thus, a machine learning system that is trained on data captured in one domain may not recognize video data that is captured in a second domain, even if the second-domain data is taken of the exact same scene.

The video content that is captured may be annotated, for example using appearance cues and motion cues, which may be extracted from raw images and optical flow, respectively. These cues can be used to extract information about the video, such as recognizing actions that are being performed by subjects within the scene 102. The cues may be bridged using unsupervised contrastive learning. Thus, the cues may first be learned from video data in a first domain, and may then be correlated with one another to enhance overall performance of the video analysis task.

In a given video, either the appearance cue or the motion cue can lead to the same output from the video analysis task. That is to say, for example, that action recognition may be based on appearance or motion. The extracted features from these two cues may be similar when projecting the features to a joint latent space. If the action in a video is, for example, "running," then the appearance cue should also map to the "running" feature. For example, if the appearance cue indicates a person on one foot on a basketball court, the motion cue may recognize the person's movement. In contrast, comparing this video with another, different video, the content or action class could be different, and the features that are extracted from either the appearance cue or the motion cue would also be different. Thus, whereas for a given video the appearance cue and the motion cue should map to similar features in a shared latent space, these features may differ significantly from the features that can be found in a different video. This property can be used as an unsupervised objective for contrastive learning.

In contrastive learning, positive and negative samples may be selected within a mini-batch to contrast features across domains or across cue type. The features may be represented herein as $F_s^a$ and $F_s^m$, representing appearance and motion features of a source video, respectively, and $F_t^a$ and $F_t^m$, representing appearance and motion features of a target video. Thus, cross-type features may be $F_t^a$ and $F_t^m$, while cross-domain features may be $F_t^a$ and $F_s^a$. These cue types may also be referred to herein as modalities. Thus, comparing features of two distinct types may be a cross-modality comparison.

Two kinds of contrastive loss functions may be used. A first contrastive loss function may include a cross-type loss that considers each type as one view. Video features for both source and target domains may be contrasted based on whether the feature is extracted from the same video. Thus, within a given video, one positive pair would be $F^a$ and $F^m$.

A second contrastive loss function may be a cross-domain loss that contrast features of each type, from different domains. Because the action labels are not available in the target domain, pseudo-labels may be generated, and positive and negative samples may be determined for the target videos. The labels may be generated by the model that is being trained. For example, given appearance and motion classifier predictions, the predictions can be averaged to provide a final prediction. In some cases, some training epochs may be performed before starting the pseudo-label process to allow the classifiers to have some training before being used.

Thus, given a source dataset that includes source videos $V_s$ and action labels $Y_s$, an action recognition model may be trained to label target videos $V_t$, which may be in a different domain from those of $V_s$. A two-stream machine learning model may be used, for example implemented using a neural network architecture. The model takes appearance and flow information for the images of the videos as input and outputs appearance features $F^a$ and motion features $F^m$, forming the four different feature spaces $F_s^a$, $F_s^m$, $F_t^a$, and $F_t^m$.

The two contrastive loss functions may be used to regularize the features. First, each type of video may be treated as a view, extracting the appearance and flow features from either the source or target video. The views may be contrasted based on whether the features come from the same video, bringing cross-type features of a same video closer to one another in an embedding space than to features extracted from different videos. Second, for features in different domains, but within the same type (e.g., $F_t^a$ and $F_s^a$), the features may be contrasted based on whether the videos share the same action label.

Each cue type maintains its own feature characteristics, and sometimes may be complementary to one another, especially for video analysis tasks like action recognition. Therefore, the features $F_s^a$ and $F_s^m$ may not be directly contrasted, as this may make a negative impact on the feature representation and reduce recognition accuracy. Given source features $F_{s_i}$ and $F_{s_j}$ from two different source videos i and j, a projection head may be applied, where the loss function may be written as:

$$\mathcal{L}_{mo}^s = -\log \frac{\sum_{k \neq l \in \{a,m\}} \phi_+^s(F_{s_i}^k, F_{s_i}^l)}{\sum_{k \neq l \in \{a,m\}} \phi_+^s(F_{s_i}^k, F_{s_{i+}}^l) + \phi_-^s(F_{s_i}^k, F_{s_{j-}}^l)}$$

where $\phi_+^s$ and $\phi_-^s$ represent the similarity measurement for positive/negative pairs between the features $F_{s_i}$ and $F_{s_j}$, with a temperature parameter $\tau$ and projection head $h(\cdot)$:

$$\phi^s(F_{s_i}^k, F_{s_j}^l)_{k \neq l \in \{a,m\}} = e^{\frac{h(F_{s_i}^k)^T h(F_{s_j}^l)}{\tau}}$$

To learn cross-type correspondences, a similar loss function $\mathcal{L}_{mo}^s$ may be used, with positive samples being selected only from different types. For target videos, a separate loss function $\mathcal{L}_{mo}^t$ can be used, with the same projection head $h(\cdot)$, where $\phi^t$ may be defined as:

$$\phi^t(F_{t_i}^k, F_t^l)_{k \neq l \in \{a,m\}} = e^{\frac{h(F_{t_i}^k)^T h(F_t^l)}{\tau}}$$

By combining $\mathcal{L}_{mo}^{s}$ and $\mathcal{L}_{mo}^{t}$ in each of the source and target domains, features within the same video, but from different types, will be positioned closer together in an embedding space, which serves as a feature regularization on the unlabeled target video.

In addition to cross-type regularization, the interplay between the four feature spaces may be further exploited using a contrastive learning objective for cross-domain samples. Taking appearance cues as an example, the features $F_s^a$ and $F_t^a$ may be used. Positive samples could be determined by finding videos with the same label across domains. However, because labels are not provided for the videos in the target domain, pseudo labels may be generated based on a prediction score. Labels with above-threshold scores may be applied to the target videos for the purpose of regularization. Samples may then be selected that have the same label in source videos and target videos.

The loss function, given source and target features combining both types, may be defined as:

$$\mathcal{L}_{do} = -\log \frac{\sum_{k=l \in \{a,m\}} \phi_+^{st}(F_{s_i}^k, F_{t_{i+}}^l)}{\sum_{k=l \in \{a,m\}} \phi_+^{st}(F_{s_i}^k, F_{t_{i+}}^l) + \phi_-^{st}(F_{s_i}^k, F_{t_{i-}}^l)}$$

where $t_{i+}$ and $t_{i-}$ denote the positive/negative target video sets determined by the pseudo-labels, with respect to source video set $s_i$. The term $\phi^{st}$ measures the similarity between features:

$$\phi^{st}(F_{s_i}^k, F_{t_i}^l)_{k=l \in \{a,m\}} = e^{\frac{F_{s_i}^{k^T} F_{t_i}^l}{\tau}}$$

For cross-domain feature regularization, using an additional projection head does not make an impact on model performance, and may be omitted. This objective function moves features with the same labels closer to one another in the embedding space.

The loss functions described above may be incorporated as:

$$\mathcal{L}_{all} = \mathcal{L}_{src}(V_s, Y_s) + \lambda(\mathcal{L}_{mo}^s(V_s)) + \mathcal{L}_{mo}^t(V_t) + \mathcal{L}_{do}(V_s, V_t, \hat{Y}_t))$$

where $\mathcal{L}_{src}$ is a cross-entropy loss on the action labels $Y_s$ for source videos $V_s$, where $\hat{Y}_t$ is a set of pseudo-labels for the videos $V_t$, and where $\lambda$ is a weight to balance cross-modality and cross-domain losses. As above, $\mathcal{L}_{mo}^s$ and $\mathcal{L}_{mo}^t$ may be implemented using the same loss form, but with a different projection head for each domain, while $\mathcal{L}_{do}^s$ takes videos from two domains at the same time and is of the same form for the appearance features and the motion features.

Rather than computing all features from the video sets $V_s$ and $V_t$ at every training iteration, the features may be stored in respective memories: $M_s^a$, $M_s^m$, $M_t^a$, and $M_t^m$. Given the features in a batch, positive and negative features may be drawn for positive and negative features, such as $F_{s_i+}^a$ being replaced by $M_{s_i+}^a$. The memory bank features may be updated with the features in the batch at the end of each iteration. A momentum update may be used, such as:

$$M_{s_i}^a = \delta M_{s_i}^a + (1-\delta) F_{s_i}^a$$

where $\delta$ is a momentum term, such as 0.5. The other memories may be updated in the same way. The momentum update encourages smoothness in training dynamics. During the training process, consecutive frames in a video clip may be randomly sampled. By using these memories, the model encourages temporal smoothness in feature learning.

Figure 2:
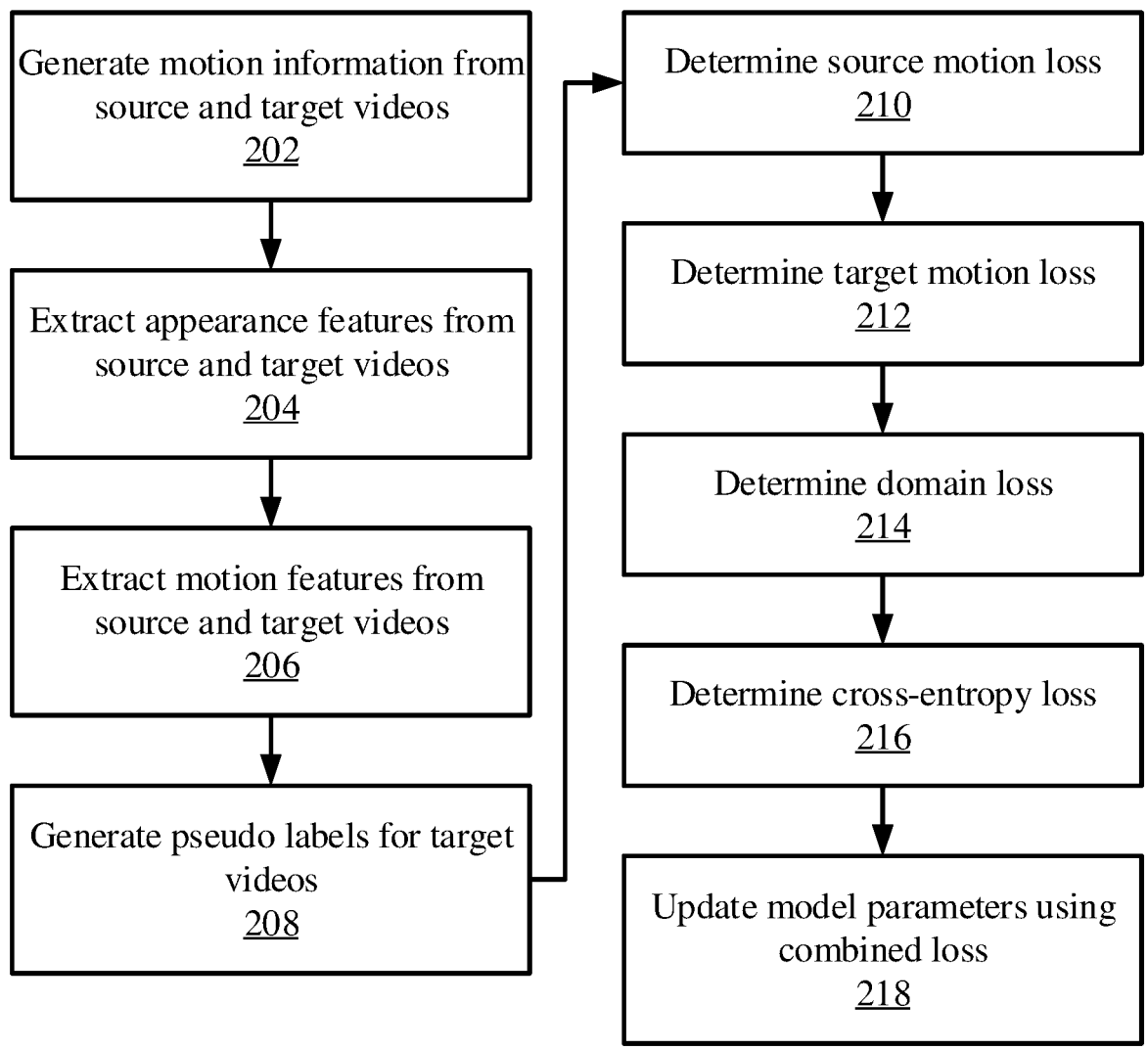
FIG. 2 is a block/flow diagram of a method for training a video analysis model using a combination of labeled and unlabeled training data, in accordance with an embodiment of the present invention.

Referring now to FIG. 2, a method of training a video analysis model is shown, using contrastive training. Block 202 accepts an input video and generates motion information from the video. For example, block 202 may identify objects within a video frame and may compare the location of the detected objects to similar objects in a previous or subsequent frame. In some cases, this motion information may be provided as part of a video set. The videos may include labeled source videos and unlabeled target videos.

Block 204 extracts appearance features from the source and target videos using, for example, an appearance feature extraction model. Block 206 extracts motion features from the source and target videos using, for example, a motion feature extraction model. Although appearance and motion features are specifically contemplated, it should be understood that any appropriate feature sets may be used instead.

Block 208 generates pseudo labels for the target videos. This supplies labels that can be used for comparison between videos across different domains that have similar labels. Block 210 determines the motion loss for the source videos and block 212 determines the motion loss for the target videos. Block 214 determines the cross-domain loss, contrasting similar features on videos of differing domains. Block 216 determines a cross-entropy loss. Block 218 updates the model parameters of the appearance convolutional neural network (CNN) and the motion CNN in accordance with a combination of the source motion loss, the target motion loss, the domain loss, and the cross-entropy loss.

Figure 3:
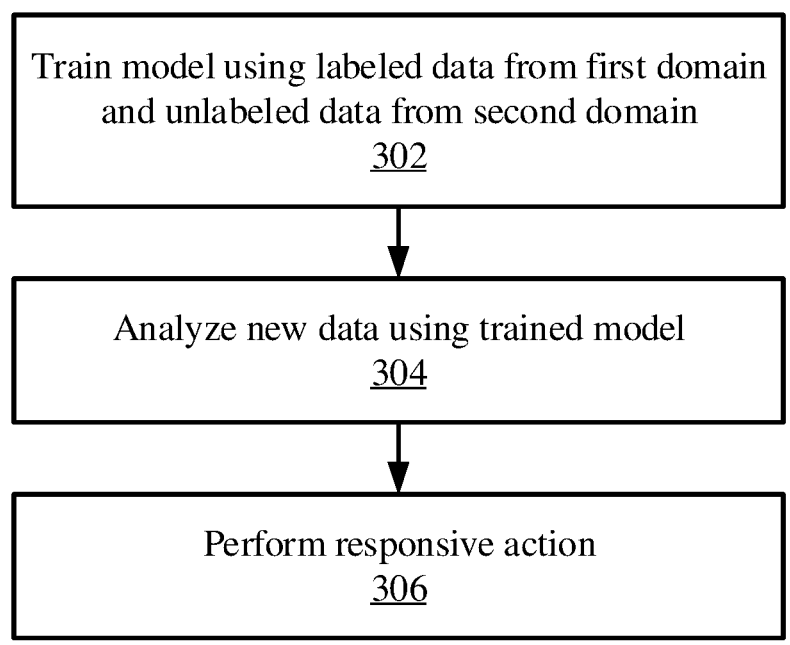
FIG. 3 is a block/flow diagram of a method for analyzing and responding to video information using a model that is trained using a combination of labeled and unlabeled training data, in accordance with an embodiment of the present invention.

Referring now to FIG. 3, a method of performing video analysis is shown. Block 302 trains a model using a set of training data. The training data set includes labeled data from a first domain and unlabeled data from a second domain. As described in greater detail above, the training may use contrastive learning to train a model to embed the videos into a latent space, where similarly labeled videos from different domains are located close to one another, and where different views of a given view are located close to one another. In this manner, the training data from the unlabeled domain can be used without a time-consuming process of labeling that data.

During runtime, block 304 analyzes new data using the trained model. For example, new video data may be provided, and that video data may be labeled. Block 306 then performs a responsive action, based on the determined label. For example, action recognition can be used for surveillance and security applications to recognize abnormal activity, such as when a person goes somewhere they are not permitted, or touches something that they do not have authorization to interact with. Action recognition may also be used for smart home applications, where gestures can be used to control smart home devices. Action recognition may further be used in healthcare applications, where a patient's interactions with therapeutic equipment and use of medications can be monitored. Action recognition may further be used in sports analysis applications, where players actions can be recognized and automatically analyzed.

Figure 4:
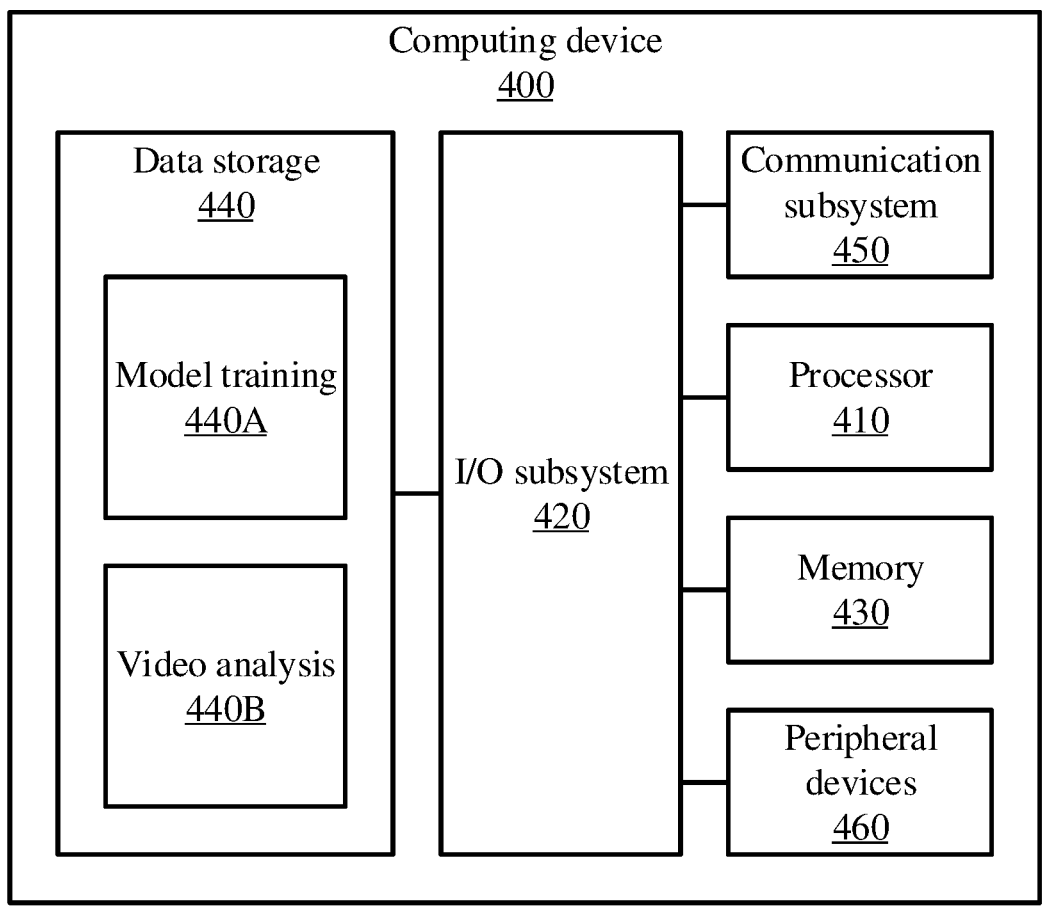
FIG. 4 is a block diagram of a computing device that can train a video analysis model and that can perform video analysis using the trained model, in accordance with an embodiment of the present invention.

FIG. 4 is a block diagram showing an exemplary computing device 400, in accordance with an embodiment of the present invention. The computing device 400 is configured to identify a top-down parametric representation of an indoor scene and provide navigation through the scene.

The computing device 400 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 400 may be embodied as a one or more compute sleds, memory sleds, or other racks, sleds, computing chassis, or other components of a physically disaggregated computing device.

As shown in FIG. 4, the computing device 400 illustratively includes the processor 410, an input/output subsystem 420, a memory 430, a data storage device 440, and a communication subsystem 450, and/or other components and devices commonly found in a server or similar computing device. The computing device 400 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 430, or portions thereof, may be incorporated in the processor 410 in some embodiments.

The processor 410 may be embodied as any type of processor capable of performing the functions described herein. The processor 410 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 430 may be embodied as any type of volatile or non-volatile memory or data storage capable of performing the functions described herein. In operation, the memory 430 may store various data and software used during operation of the computing device 400, such as operating systems, applications, programs, libraries, and drivers. The memory 430 is communicatively coupled to the processor 410 via the I/O subsystem 420, which may be embodied as circuitry and/or components to facilitate input/output operations with the processor 410, the memory 430, and other components of the computing device 400. For example, the I/O subsystem 420 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 420 may form a portion of a system-on-a-chip (SOC) and be incorporated, along with the processor 410, the memory 430, and other components of the computing device 400, on a single integrated circuit chip.

The data storage device 440 may be embodied as any type of device or devices configured for short-term or long-term storage of data such as, for example, memory devices and circuits, memory cards, hard disk drives, solid state drives, or other data storage devices. The data storage device 440 can store program code 440A for training a video analysis model, for example using labeled and unlabeled training data, and program code 440B for using a trained model to perform video analysis. The communication subsystem 450 of the computing device 400 may be embodied as any network interface controller or other communication circuit, device, or collection thereof, capable of enabling communications between the computing device 400 and other remote devices over a network. The communication subsystem 450 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 400 may also include one or more peripheral devices 460. The peripheral devices 460 may include any number of additional input/output devices, interface devices, and/or other peripheral devices. For example, in some embodiments, the peripheral devices 460 may include a display, touch screen, graphics circuitry, keyboard, mouse, speaker system, microphone, network interface, and/or other input/output devices, interface devices, video capture device, and/or peripheral devices.

Of course, the computing device 400 may also include other elements (not shown), as readily contemplated by one of skill in the art, as well as omit certain elements. For example, various other sensors, input devices, and/or output devices can be included in computing device 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 400 are readily contemplated by one of ordinary skill in the art given the teachings of the present invention provided herein.

These and other variations of a hardware processor subsystem are also contemplated in accordance with embodiments of the present invention.

Figure 5:
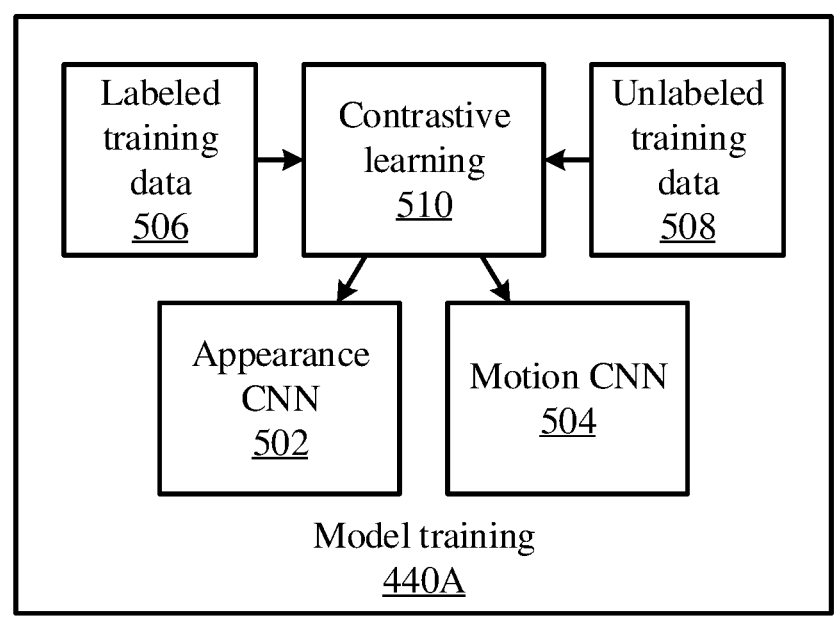
FIG. 5 is a block diagram of a computer program for training a video analysis model using a combination of labeled and unlabeled training data, in accordance with an embodiment of the present invention.

Referring now to FIG. 5, additional detail on the model training 440A is shown. The model may include an appearance CNN 502, which processes appearance features of an input video, and a motion CNN 504, which processes motion features of the input video. Contrastive learning 510 uses labeled training data 506, which may be in a first domain, and unlabeled training data 508, which may be in a second domain, to train the appearance CNN 502 and the motion CNN 504.

The model may be implemented using an artificial neural network architecture. CNNs process information using a sliding "window" across an input, with each neuron in a CNN layer having a respective "filter" that is applied at each window position. Each filter may be trained, for example, to handle a respective pattern within an input. CNNs are particularly useful in processing images, where local relationships between individual pixels may be captured by the filter as it passes through different regions of the image. The output of a neuron in a CNN layer may include a set of values, representing whether the respective filter matched each set of values in the sliding window.

Figure 6:
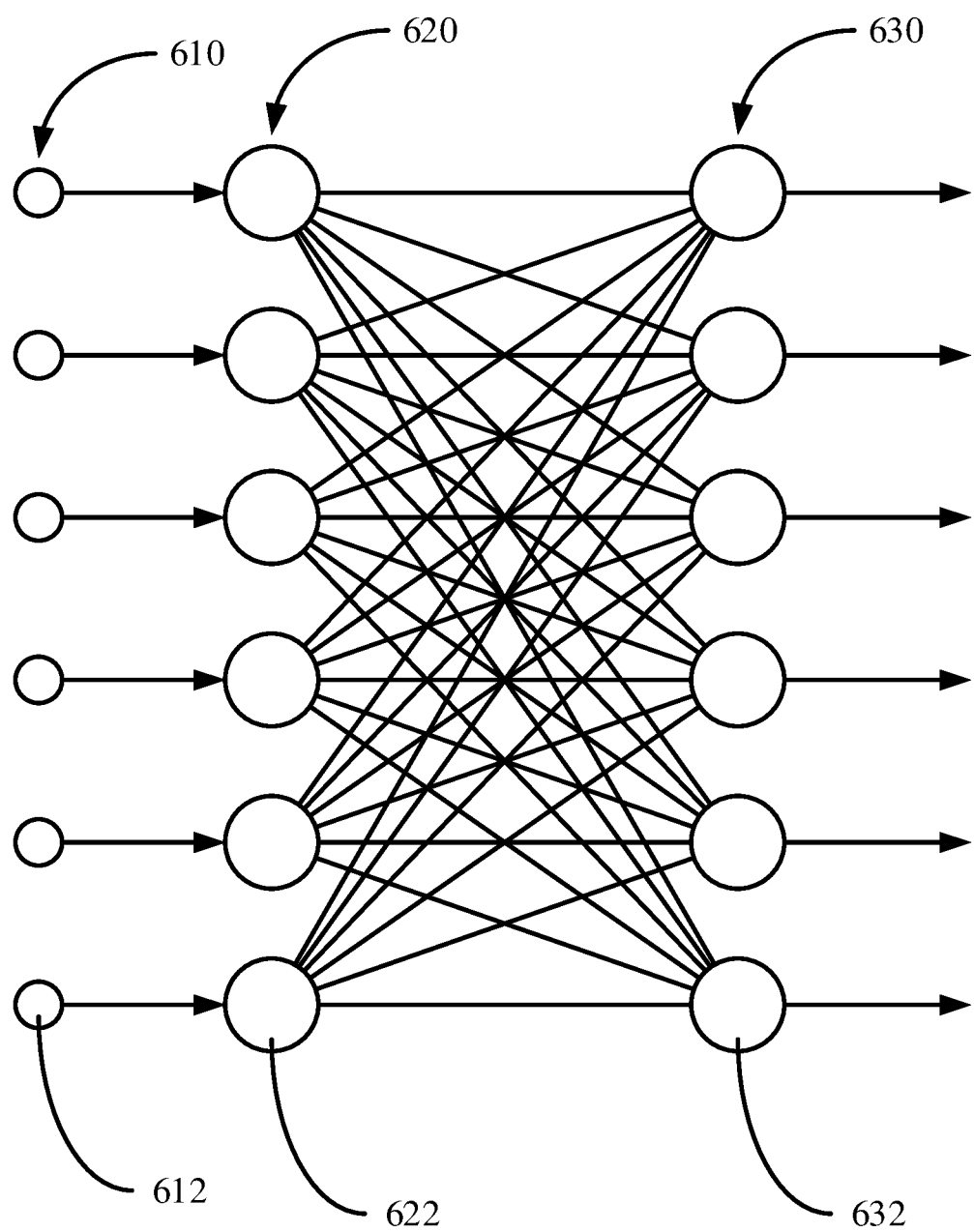
FIG. 6 is a diagram of a neural network architecture, in accordance with an embodiment of the present invention.

Referring now to FIG. 6, an exemplary neural network architecture is shown. In layered neural networks, nodes are arranged in the form of layers. A simple neural network has an input layer 620 of source nodes 622, a single computation layer 630 having one or more computation nodes 632 that also act as output nodes, where there is a single node 632 for each possible category into which the input example could be classified. An input layer 620 can have a number of source nodes 622 equal to the number of data values 612 in the input data 610. The data values 612 in the input data 610 can be represented as a column vector. Each computational node 632 in the computation layer generates a linear combination of weighted values from the input data 610 fed into input nodes 620, and applies a non-linear activation function that is differentiable to the sum. The simple neural network can perform classification on linearly separable examples (e.g., patterns).

Figure 7:
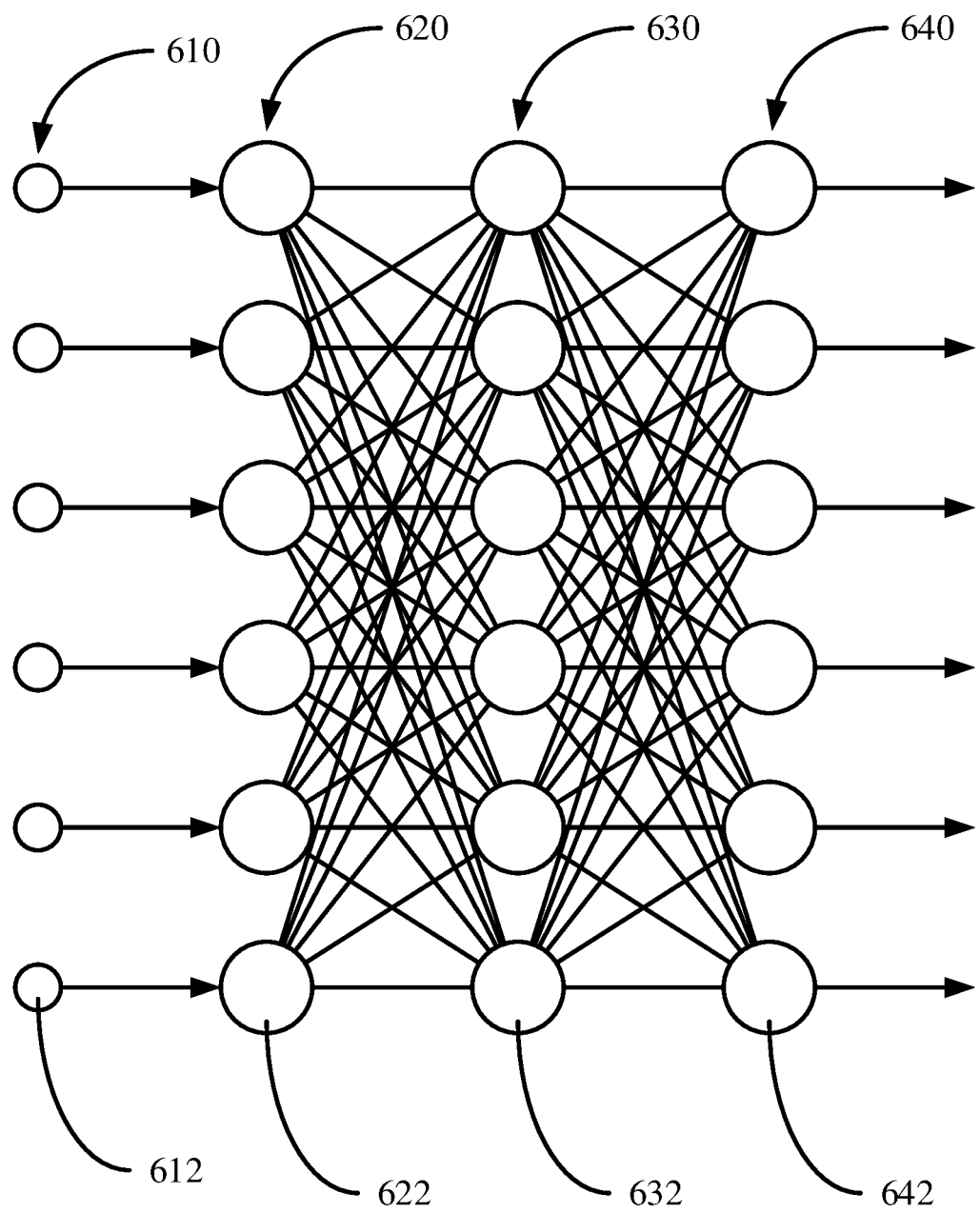
FIG. 7 is a diagram of a deep neural network architecture, in accordance with an embodiment of the present invention.

Referring now to FIG. 7, a deep neural network architecture is shown. A deep neural network, also referred to as a multilayer perceptron, has an input layer 620 of source nodes 622, one or more computation layer(s) 630 having one or more computation nodes 632, and an output layer 640, where there is a single output node 642 for each possible category into which the input example could be classified. An input layer 620 can have a number of source nodes 622 equal to the number of data values 612 in the input data 610. The computation nodes 632 in the computation layer(s) 630 can also be referred to as hidden layers because they are between the source nodes 622 and output node(s) 642 and not directly observed. Each node 632, 642 in a computation layer generates a linear combination of weighted values from the values output from the nodes in a previous layer, and applies a non-linear activation function that is differentiable to the sum. The weights applied to the value from each previous node can be denoted, for example, by $w_1, w_2, w_{n-1}, w_n$. The output layer provides the overall response of the network to the inputted data. A deep neural network can be fully connected, where each node in a computational layer is connected to all other nodes in the previous layer. If links between nodes are missing the network is referred to as partially connected.

Training a deep neural network can involve two phases, a forward phase where the weights of each node are fixed and the input propagates through the network, and a backwards phase where an error value is propagated backwards through the network.

The computation nodes 632 in the one or more computation (hidden) layer(s) 630 perform a nonlinear transformation on the input data 612 that generates a feature space. In the feature space the classes or categories may be more easily separated than in the original data space.

The neural network architectures of FIGS. 6 and 7 may be used to implement, for example, any of the models shown in FIG. 5. To train a neural network, training data can be divided into a training set and a testing set. The training data includes pairs of an input and a known output. During training, the inputs of the training set are fed into the neural network using feed-forward propagation. After each input, the output of the neural network is compared to the respective known output. Discrepancies between the output of the neural network and the known output that is associated with that particular input are used to generate an error value, which may be backpropagated through the neural network, after which the weight values of the neural network may be updated. This process continues until the pairs in the training set are exhausted.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented video method, comprising:
extracting features of a first modality and a second modality from a labeled first training dataset in a first domain and an unlabeled second training dataset in a second domain;
training a video analysis model using contrastive learning on the extracted features, including optimization of a loss function that includes a cross-domain regularization part that compares features from a first training data from the first training dataset and a second training data from the second training dataset, the second training data having a pseudo label that matches the label of the first training data, and a cross-modality regularization part that compares features from different cue types in a same domain, with the cross-domain less regularization part being expressed as $$\mathcal{L}_{do} = -\log \frac{\sum_{k=l\in\{a,m\}} \phi_+^{st}(F_{s_i}^k, F_{t_i+}^l)}{\sum_{k=l\in\{a,m\}} \phi_+^{st}(F_{s_i}^k, F_{t_i+}^l) + \phi_-^{st}(F_{s_i}^k, F_{t_i-}^l)}$$

where $\phi_+^{st}(F_{s_i}^k, F_{t_i+}^l)$ measures similarity between features having a same modality and different domains for positive samples and $\phi_-^{st}(F_{s_i}^k, F_{t_i-}^l)$ measures similarity between features having a same modality and different domains for negative samples, and further including generating pseudo-labels for the unlabeled dataset.

2. The computer-implemented method of claim 1, wherein the pseudo-labels are generated by the video analysis model.

3. The computer-implemented method of claim 1, wherein the different cue types include appearance features and motion features.

4. The computer-implemented method of claim 1, wherein the first domain relates to video taken from a first perspective and the second domain relates to video taken from a second, different perspective.

5. The computer-implemented method of claim 1, wherein the loss function is represented as:

$$\mathcal{L}_{all} = \mathcal{L}_{src}(V_s, Y_s) + \lambda(\mathcal{L}_{mo}^s(V_s) + \mathcal{L}_{mo}^t(V_t) + \mathcal{L}_{do}(V_s, V_t, \hat{Y}_t)$$

where $V_s$ is a set of videos in a source domain, $V_t$ is a set of videos in a target domain, $Y_s$ are labels for the source videos, $\hat{Y}_t$ are pseudo-labels for the target videos, $\mathcal{L}_{src}$ is a cross-entropy loss for the source videos, $\mathcal{L}_{mo}^s$ is a cross-modality loss term for the source videos, $\mathcal{L}_{mo}^t$ is a cross-modality loss term for the target videos, and $\lambda$ is a balancing parameter.

6. The computer-implemented method of claim 5, wherein the cross-modality loss term for the source videos is expressed as:

$$\mathcal{L}_{mo}^s = -\log \frac{\sum_{k\neq l\in\{a,m\}} \phi_+^s(F_{s_i}^k, F_{s_i}^l)}{\sum_{k\neq l\in\{a,m\}} \phi_+^s(F_{s_i}^k, F_{s_i}^l) + \phi_-^s(F_{s_i}^k, F_{s_j-}^l)}$$

where $\phi_+^s(F_{s_i}^k, F_{t_i+}^l)$ measures similarity between features having a different modality and same domain for positive samples and $\phi_-^{st}(F_{s_i}^k, F_{t_i-}^l)$ measures similarity between features having a different modality and same domain for negative samples.

7. The method of claim 1, further comprising performing action recognition on an input video using the trained video analysis model.

8. A computer-implemented video method, comprising:
extracting features of a first modality and a second modality from a labeled first training dataset in a first domain, relating to video taken from a first perspective, and an unlabeled second training dataset in a second domain, relating to video taken from a second, different perspective;
training a video analysis model using contrastive learning on the extracted features, including:
generating pseudo-labels for the unlabeled training dataset using the video analysis model;
optimization of a loss function that includes a cross-domain regularization part, that compares features from a first training data from the first training dataset and a second training data from the second training dataset, the second training data having a pseudo label that matches the label of the first training data, and a cross-modality regularization part, that compares features from different cue types in a same domain, with the cross-domain regularization part being expressed as $$\mathcal{L}_{do} = -\log \frac{\sum_{k=l\in\{a,m\}} \phi_+^{st}(F_{s_i}^k, F_{t_i+}^l)}{\sum_{k=l\in\{a,m\}} \phi_+^{st}(F_{s_i}^k, F_{t_i+}^l) + \phi_-^{st}(F_{s_i}^k, F_{t_i-}^l)}$$

where $\phi_+^{st}(F_{s_i}^k, F_{t_i+}^l)$ measures similarity between features having a same modality and different domains for positive samples and $\phi_-^{st}(F_{s_i}^k, F_{t_i-}^l)$ measures similarity between features having a same modality and different domains for negative samples.

9. A video system, comprising:

a hardware processor; and a memory that stores a computer program that, when executed by the hardware processor, causes the hardware processor to:

extract features of a first modality and a second modality from a labeled first training dataset in a first domain and an unlabeled second training dataset in a second domain;

training a video analysis model using contrastive learning on the extracted features, including optimization of a loss function that includes a cross-domain regularization part that compares features from a first training data from the first training dataset and a second training data from the second training dataset, the second training data having a pseudo label that matches the label of the first training data, and a cross-modality regularization part that compares features from different cue types in a same domain, with the cross-domain regularization part being expressed as $$\mathcal{L}_{do} = -\log \frac{\sum_{k=l\in\{a,m\}} \phi_+^{st}(F_{s_i}^k, F_{t_i+}^l)}{\sum_{k=l\in\{a,m\}} \phi_+^{st}(F_{s_i}^k, F_{t_i+}^l) + \phi_-^{st}(F_{s_i}^k, F_{t_i-}^l)}$$

where $\phi_+^{st}(F_{s_i}^k, F_{t_i+}^l)$ measures similarity between features having a same modality and different domains for positive samples and $\phi_-^{st}(F_{s_i}^k, F_{t_i-}^l)$ measures similarity between features having a same modality and different domains for negative samples; and generating pseudo-labels for the unlabeled training dataset.

10. The system of claim 9, wherein the pseudo-labels are generated by the video analysis model.

11. The system of claim 9, wherein the different cue types include appearance features and motion features.

12. The system of claim 9, wherein the loss function is represented as:

$$\mathcal{L}_{all} = \mathcal{L}_{src}(V_s, Y_s) + \lambda(\mathcal{L}_{mo}^s(V_s) + \mathcal{L}_{mo}^t(V_t) + \mathcal{L}_{do}(V_s, V_t, \hat{Y}_t))$$

where $V_s$ is a set of videos in a source domain, $V_t$ is a set of videos in a target domain, $Y_s$ are labels for the source videos, $\hat{Y}_t$ are pseudo-labels for the target videos, $\mathcal{L}_{src}$ is a cross-entropy loss for the source videos, $\mathcal{L}_{mo}^s$ is a cross-modality loss term for the source videos, $\mathcal{L}_{mo}^t$ is a cross-modality loss term for the target videos, and $\lambda$ is a balancing parameter.

13. The system of claim 12, wherein the cross-modality loss term for the source videos is expressed as:

$$\mathcal{L}_{mo}^s = -\log \frac{\sum_{k\neq l\in\{a,m\}} \phi_+^s(F_{s_i}^k, F_{s_i}^l)}{\sum_{k\neq l\in\{a,m\}} \phi_+^s(F_{s_i}^k, F_{s_{i+}}^l) + \phi_-^s(F_{s_i}^k, F_{s_{j-}}^l)}$$

where $\phi_+^{st}(F_{s_i}^k, F_{t_i+}^l)$ measures similarity between features having a different modality and same domain for positive samples and $\phi_-^{st}(F_{s_i}^k, F_{t_i-}^l)$ measures similarity between features having a different modality and same domain for negative samples.

* * * * *